Sept. 24, 1968   B. THARPE   3,402,799
DIFFERENTIAL MECHANISM
Original Filed July 29, 1965
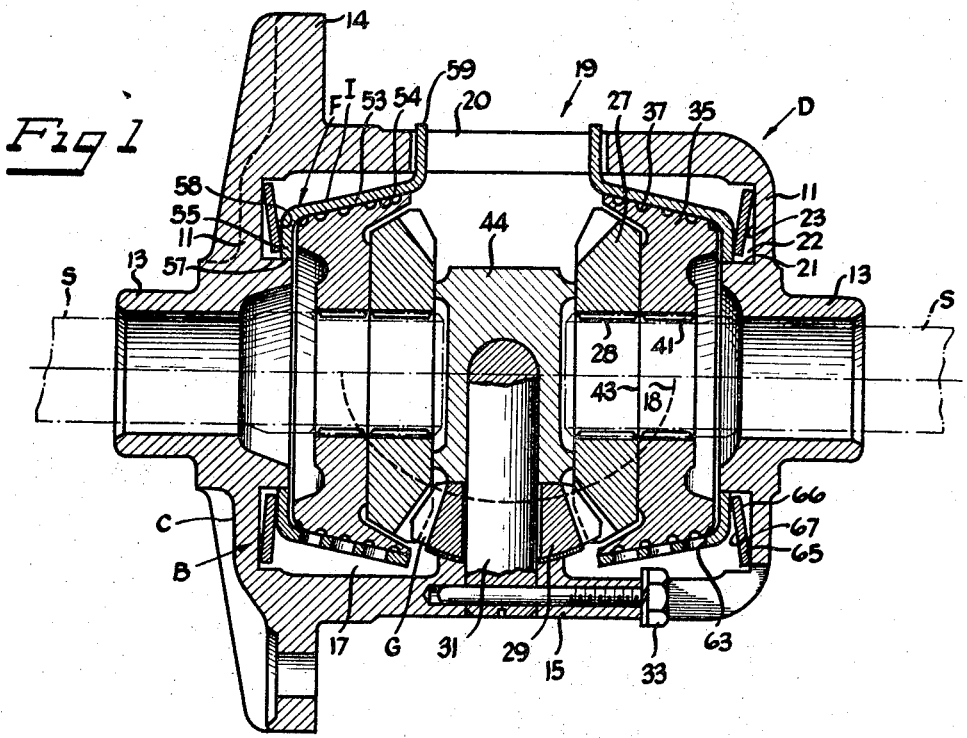
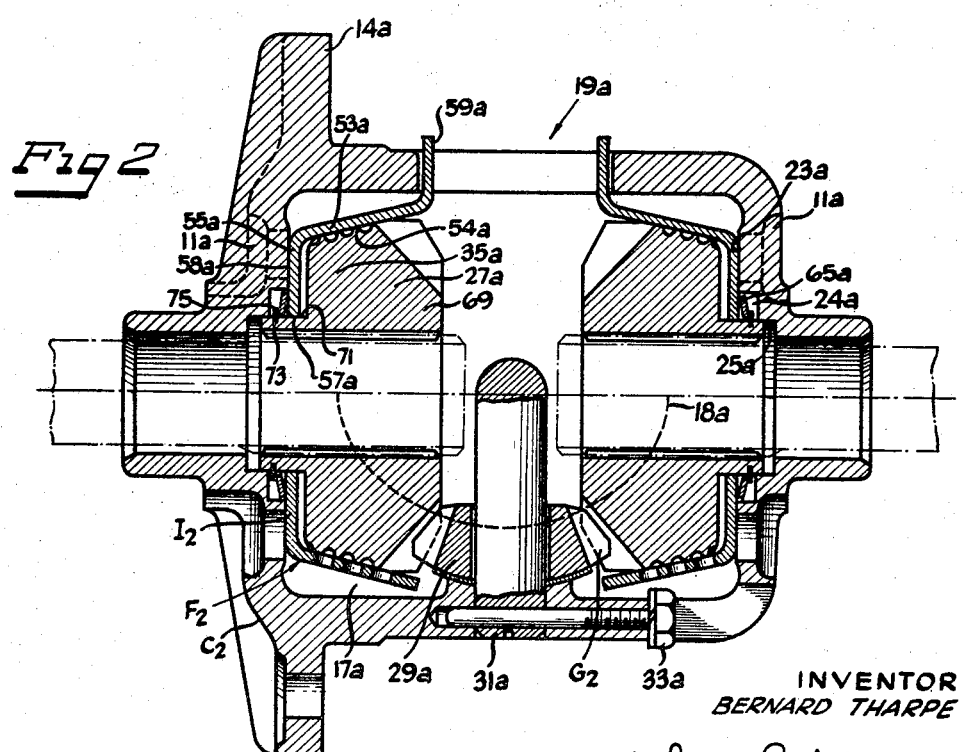
INVENTOR
BERNARD THARPE
BY John W Butcher
ATTORNEY United States Patent Office 3,402,799
Patented Sept. 24, 1968

3,402,799
DIFFERENTIAL MECHANISM
Bernard Tharpe, Garrett, Ind., assignor to Borg-Warner Corporation, Chicago, Ill., a corporation of Illinois
Original application July 29, 1965, Ser. No. 475,815, now Patent No. 3,327,564, dated June 27, 1967. Divided and this application May 10, 1967, Ser. No. 655,968
2 Claims. (Cl. 192—107)

ABSTRACT OF THE DISCLOSURE

A preassembled sub-assembly for a limited slip differential mechanism including a shaft engaging member having a conical clutch member portion, an insert defining a conical clutch member engaging surface and a biasing means urging said clutch member portion into frictional engagement with said insert conical seat surface.

---

The present invention is a divisional application of Ser. No. 475,815, now Pat. No. 3,327,564, filed July 29, 1965, entitled Differential Mechanism.

This invention relates to limited slip differential mechanisms which provide a predetermined resistance to differential action. More particularly, it relates to limited slip differential mechanisms which utilize conically shaped clutch members to provide the resistance to free differentiation.

It is the principal object of the present invention to provide an improved form of limited slip differential mechanism utilizing a conically shaped clutch to resist differentiation.

It is a further object of the present invention to provide an improved form of limited slip differential mechanism utilizing conically shaped clutches to resist differentiation wherein the machining of conically shaped cone seat surface on the interior of the mechanism is eliminated.

It is another object of the present invention to provide an improved form of limited slip differential mechanism of the type described which includes separate removable inserts which form the conically shaped cone seat surfaces.

It is another object of the present invention to provide a limited slip differential mechanism having removable cone seat inserts wherein initial frictional engagement of the clutch members is effected by spring type washers operative upon the inserts.

It is another object of the present invention to provide a limited slip differential mechanism utilizing conical clutch members to resist differential action having separate removable cone seat inserts wherein the inserts are urged into frictional engagement with the clutch members by biasing means interposed between the casing and the inserts.

It is still a further object of the present invention to provide a subassembly for a limited slip differential mechanism which includes a removable cone seat insert and a conical clutch member which are maintained in an initial predetermined frictional engagement.

These and other objects of the present invention will become apparent with reference to the following description and the accompanying drawings.

In the drawings:

FIGURE 1 is a revolved cross-sectional view of a differential mechanism constructed in accordance with the present invention showing various of the features thereof;

FIGURE 2 is a revolved cross-sectional view of a modified form of the invention incorporating various of the features thereof.

Very generally, the present invention is directed to a differential mechanism utilizing cone shaped clutches to resist differential action between output shafts. The clutches include separate, removable inserts which form conically shaped cone seat surfaces associated with the mechanism casing which provide the frictional surfaces for engagement of complementary clutch members associated with the output shafts and which are maintained in initial frictional engagement by spring washer type biasing means operative upon the inserts.

Referring now to the drawings, and particularly to the embodiment of FIGURE 1, there is shown a differential mechanism generally designated D disposed in operative association with a pair of coaxially aligned relatively rotatable output shafts S. These shafts may form the driving axle of an automotive or commercial vehicle, farm tractor, or any other device which requires distribution of torque to two utilization points where relative movement between shafts occurs under certain operating conditions.

The mechanism D includes a casing C surrounding adjacent ends of the output shafts S which casing is adapted to receive input torque from a drive line system (not shown). A bevel gear system generally designated G is connected between the casing C and the shafts S and transmits rotational effort to the shafts while simultaneously allowing relative rotation between them when required, as when an automotive vehicle negotiates a corner.

A pair of friction clutches F provide the desired resistance to differential action. Of course, only one clutch associated with one of the output shafts S may be used. Each clutch includes a friction surface associated with the casing C and a friction surface associated with one of the output shafts S. Frictional engagement of these surfaces provides a direct path for transmission of rotational effort from the casing to the output shafts independent the bevel gear system G. The clutches thus overcome the inherent ability of the mechanism to allow differentiation between shafts and torque is transmitted to both shafts even though they may experience unequal loading.

The friction surfaces of the clutches F are maintained in engagement by a biasing arrangement B which provides an initial preload to insure that at least a predetermined minimum resistance to differential action exists.

Each of the clutches F includes a removable insert I which is connected to the casing C for rotation therewith and which forms the friction surface of the clutch F associated with the casing C.

More specifically, the differential casing C is integrally formed as by casting, and may be constructed of any suitable material such as, for example, malleable iron.

The casing C includes a pair of spaced apart, generally parallel transverse walls 11 each of which includes a longitudinally elongated hub 13 adapted to receive one of the output shafts S. The shafts S are not journalled in the hubs 13, but rather the hubs support bearings (not shown) which position the mechanism D within the axle assembly.

One of the transverse walls 11 is provided with a radially directed flange 14 to which is secured a ring gear (not shown) adapted to receive input torque from the associated drive line system.

The transverse walls are connected by a longitudinally extending, generally cylindrical wall 15 which defines, with the walls 11, an internal cavity 17 surrounding the adjacent ends of the output shafts.

The cylindrical wall 15 is provided with a side port 18 defining a relatively large access opening.

The side port opening 18 additionally allows lubricant to enter the cavity for lubrication of both the bevel gear system G and the clutches F and is utilized for assembly of the mechanism.

A second side port 19 is provided which includes a pair of longitudinally directed side wall surfaces 20 which are disposed in longitudinally spaced apart pairs.

The interior surface of each of the transverse walls 11 is provided with a generally cylindrical pilot surface or shoulder 21 disposed coaxially of the longitudinal axis of the shafts S and the hubs 13. The side wall 11 extends radially outwardly from the shoulder 21 to form an annular pocket 22 having a radially directed stop surface 23. The shoulder 21 and stop surface 23 act to position the insert I within the cavity 17, as will be explained. The pocket 22 is necessary for the biasing arrangement B as will also be explained in greater detail shortly.

Referring now to the bevel gear system G, there is provided an arrangement which transmits output torque to the shafts S and simultaneously allows relative rotation between shafts when necessary, as when a vehicle is cornering.

The bevel gear system includes a pair of side gears 27, each of which is connected to one of the shafts S for rotational movement therewith and axial movement thereon. To effect this relationship between the shafts and side gears, the adjacent ends of the shafts S and the internal bore of the gears are splined as at 28.

The side gears are in constant mesh with a pair of pinion gears 29 supported by a transversely extending pinion pin 31 disposed intermediate the adjacent ends of the shafts S and secured to the casing C for rotation therewith by retainer screw 33.

As can be appreciated, rotation of the differential casing C by the drive line system causes the pinion pin 31 to revolve about the centerline of the shafts S. The pinion gears 29, therefore, transcribe a generally cylindrical path about the axis of the shafts, and as they are in mesh with the side gears 27, the side gears are caused to rotate and thereby transmit torsional effort to the output shafts S.

If one of the output shafts is required to rotate at a different speed from the other, as when cornering, the pinion gears 29 not only revolve about the longitudinal axis of the output shafts, but also rotate about the pinion pin 31 allowing relative movement between the side gears 27. Consequently, the output shafts S rotate relative to each other as well as relative to the casing C.

Differentiation, i.e., relative rotation between the shafts, inherently possible by virtue of the above described structure, is resisted by the engagement of the friction surfaces of the clutches F. Each of these clutches includes a frusto-conical clutch member 35 and one of the cone seat inserts I frictionally engaged by the member 35 along a complementary conical surface.

A spirally progressing groove 37 is provided in the conical surface of the clutch member 35 for distribution of oil or other lubricant to the frictionally engaged surfaces.

Each clutch member 35 includes an internally splined bore 41 connected to one of the shafts S, and is therefore, rotatable with the shaft and axially movable thereon. Each of the clutch members 35 is disposed between one of the transverse walls 11 of the casing C and one of the side gears 27. The respective side gear 27 and the clutch member 35 of each shaft S are in radial contact along the surface 43 and movement of either of these members toward the other, therefore, causes a corresponding movement of the other element in the same direction. The side gears are maintained in a predetermined spaced apart relation by a thrust block 44 disposed between the side gears in surrounding relation to the pinion pin. The thrust block prevents movement of the side gears in a direction toward the pinion pin beyond a predetermined amount.

The conical drum or seat surfaces, frictionally engaged by the clutch members 35, are provided by the removable cone seat inserts I. These inserts include a generally conically shaped wall portion 53, the interior of which includes a conical seat surface 54 engaged by the clutch member 35. The inserts I may be formed of any suitable material such as, for example, steel, and may be made by any one of several manufacturing processes, such as stamping, turning, spinning, grinding, etc.

The convergent end of the conical wall 53 of each insert is provided with an inwardly directed radial flange 55 terminating in a generally cylindrical pilot surface 57 having a diameter approximately equal to the diameter of the pilot shoulder 21, of the casing C. The insert is disposed within the differential casing with the pilot surface 57 overlying the shoulder 21 formed on the casing wall 11 to effect radial location of the insert with respect to the output shafts S and accordingly with respect to the clutch members 35.

Further, an outer surface 58 of the radial flange 55 of each insert is disposed in axially spaced relation to the stop surface 23 of the pocket 22 and the inserts are, therefore, axially movable along the surface 21 for reasons as will be explained.

As can readily be appreciated, the inserts I must, of necessity, be retained in relatively stationary relationship with respect to the casing C in order to transmit rotational effort from the casing to the clutch members 35 for purposes of resisting differentiation.

This is accomplished by a radially directed tab 59 extending outwardly of the divergent end of the conical wall 53 of each of the inserts I. Each tab 59 is disposed between the longitudinal side wall surfaces 20 of the side port opening 19. Engagement of transverse ends of the tabs 59 with the surfaces 20 effects a driving engagement between the inserts and the drive casing C.

In the embodiment shown, only one such drive tab is provided upon each of the inserts I. Of course, this number could be varied, without departing from the scope of the invention and additional side port openings or slots could be provided about the cylindrical wall 15 to accept the additional drive tabs.

Each insert I is provided with a plurality of lubricating orifices 63 to supply lubricant to the spirally progressing groove 37 of the clutch member 35. These orifices are disposed longitudinally along the insert conical wall 53 in one or more rows as desired. Lubricant within the cavity 17 of the casing C may pass through these orifices into communication with the spiral grooves 37 for distribution to the frictionally engaged surfaces.

In accordance with the present invention, initial frictional engagement of the clutches F is provided by the biasing arrangement B. A generally annular spring-type washer 65 is disposed in each of the pockets 22 of the casing C. Each washer includes a radial surface 66 in contact with the stop surface 23 of one of the pockets 22 and a radial surface 67 in contact with the outer surface 58 of the inwardly directed radial flange 55 of one of the inserts I. Compression of the spring washers 65 causes them to exert an axial force upon the inserts I tending to move them toward the pinion pin 31.

As previously stated, the inserts, clutch members 35 and side gears 27 are retained in spaced apart relation by thrust block 44. The axial width of the thrust block is such that with the parts assembled in the mechanism casing C, the spring washers 65 are disposed in the pockets 22 in a compressed condition. The inserts I are, therefore, urged toward the clutch members 35 and as the clutch members and side gears cannot move toward the pinion pin because of the presence of the thrust block 44, frictional engagement of the clutch members with the surface 54 of the inserts is effected. If a semi-floating or C washer axle arrangement were used, the thrust block 44 would not be necessary. The shafts S would contact the pinion pin and the C washers which normally engage the shafts and contact the side gears would oppose inward movement of the gears to resist the force of the spring washers.

The initial frictional engagement provided by biasing arrangement B, as described above, is supplemented by the axial separating forces exerted upon the side gears 27 upon application of input torque to the mechanism. The axial separating forces urge the side gears 27 and the clutch members 35 axially outwardly away from the thrust block 44. The insert I is free to move axially along the shoulder 21 until the spring washer 65 is completely compressed between the radial stop surface 23 of the pocket and the radially directed outer surface 58 of the flange 55 of the insert I. Once this position is reached, further application of axial forces upon the side gears and clutch members causes a resultant increase in the frictional engagement of the clutch member conical surface with the inserts I providing corresponding increased resistance to differential action.

In assembling the mechanism, the components are positioned within the casing through the side port opening 18. First, each one of the inserts I is disposed in overlying relation to one of the clutch members 35. The spring washers 65 are disposed within the pockets 22 of the casing C and the inserts and clutch members are positioned within the mechanism with the cylindrical pilot surface 57 disposed in surrounding relation to the cylindrical pilot shoulder 21. The tabs 59 are disposed within the side ports 19 in engagement with the surface 20.

The bevel gear system G is then positioned within the mechanism and appropriately aligned for acceptance of the pinion pin 31. The side gears 27 are then separated a distance sufficient to allow disposition of the thrust block 44 within the mechanism thus compressing the spring washers 65 to effect initial frictional engagement of the inserts with the clutch members. The thrust block is then positioned between the side gears and the pinion pin is positioned within the mechanism and secured to the casing C to complete the assembly procedure.

Turning now to the embodiment of FIGURE 2, there is shown a modified form of the invention incorporating preassembled clutches F, the components of which are placed into frictional engagement prior to assembly within the mechanism.

A casing $C_2$ is provided having a pair of transverse walls 11A, each of which is provided with a radially directed stop surface 23a, a generally annular relief 24a, formed axially outwardly of the stop surface 23a, and an internal generally cylindrical pilot surface 25a extending axially outwardly of the relief 24a. The casing includes side ports 18a and 19a which are constructed similarly to the side ports 18 and 19 of FIGURE 1.

Clutches $F_2$ are provided which include inserts $I_2$ and shaft engaging members 69 which include a side gear portion 27a and a clutch member portion 35a integrally formed as a single unit. The shaft engaging members 69 are splined to output shafts $S_2$ for transmission of rotational effort thereto.

Each of these members 69 further includes a longitudinally directed cylindrical pilot surface 71 having a diameter approximately equal to the internal pilot surface 25a of the casing C. A free end of the surface 71 is disposed within the opening formed by the internal pilot surface 25a and provides radial positioning of each of the members within the casing $C_2$. Each of the pilot surfaces 71 includes a snap ring groove 73 adjacent the free end for purposes as will be explained shortly.

Each one of the inserts $I_2$ includes a generally conical wall 53a having a conical surface 54a, and a radially inwardly directed flange 55a adjacent the convergent end of the conical wall. The radially directed flange 55a terminates in the cylindrical pilot surface 57a which overlies the cylindrical surface 71 of the shaft engaging member 69 to radially position the insert with respect thereto. An outer surface 58a of the radial flange 55a is disposed in radial contact with the axial stop surface 23a of the casing $C_2$ to axially position the inserts within the mechanism, and a drive tab 57a is provided which is disposed in the side port opening 19a to provide driving engagement of the insert $I_2$ and the casing $C_2$.

An annular spring-type washer 65a, such as a Belleville washer, is disposed within the relief 24a of each transverse wall 11a in surrounding relation to the cylindrical surface 71 of the shaft engaging members 69. A snap ring 75, disposed within the snap ring groove 73, prevents axial movement of the springs in a direction toward the free end of the cylindrical surfaces 71. The spring washers are interposed between the snap ring 75 and the outer surface 58a of the radially directed flange 55a of the inserts I in a compressed condition. This results in the exertion of an axial force upon the inserts $I_2$ urging the conical surfaces 54a into frictional engagement with the clutch member portions of the shaft engaging members, thus providing initial predetermined frictional engagement between the clutch member portions and the inserts.

A bevel gear system $G_2$, generally similar to the bevel gear system of FIGURE 1, is provided which includes pinion gears 29a which are in mesh with the side gear portions 27a of the shaft engaging members 69. Transmission of rotational effort to the casing $C_2$ creates separating forces between the pinion gears and the side gear portions 27a causing the shaft engaging members to be urged axially outwardly. As the radial surface 58a of each insert is disposed in radial contact with the axial stop surfaces 23a, the inserts are prevented from moving axially outwardly and the separating forces are effective to increase the frictional engagement between the clutch member portions 35a and the conical surfaces 54a.

As can be appreciated, the inserts I and shaft engaging members 69 may be placed in initial frictional engagement prior to assembly within the unit. The inserts are first positioned in overlying relation to the shaft engaging members with the cylindrical pilot surfaces 57a in surrounding relation to the cylindrical pilot surfaces 71 of the members 69. The spring washers 65a are then positioned upon the cylindrical surfaces 71 and compressed until the snap rings 75 may be placed within the snap ring grooves 73. This effects frictional engagement of the conical surfaces 54a with the clutch member portions 35a of the members 69. These sub-assemblies may then be positioned within the mechanism casing in a manner similar to the assembly of the embodiment of FIGURE 1.

As can be appreciated, the shaft engaging members 69 may be made of separate parts forming a clutch member 35a and side gear 27a without in any way departing from the scope of the invention.

While certain specific embodiments of the invention have been disclosed, it is intended that the invention is not limited thereto, as many variations will be readily apparent to those skilled in the art and the invention is to be given its fullest interpretation within the terms of the following claims.

What is claimed is:

1. A preassembled subassembly for a limited slip differential mechanism comprising: a shaft engaging member including a conical clutch member portion having, a longitudinally directed cylindrical pilot surface having an end connected to said clutch member portion and a removable snap ring connected to said cylindrical pilot surface in spaced relation to said clutch member portion; a removable insert, said insert including a conical wall defining a conical seat surface to frictionally engage said clutch member portion of said shaft engaging member, and including a flange adjacent the convergent end of said conical seat surface extending generally radially inwardly and terminating in a generally cylindrical pilot surface disposed in surrounding relation to said cylindrical pilot surface of said shaft engaging member to radially position said insert with respect thereto, said flange including a radially directed surface; and a generally annular spring-type washer compressed between said outer radial surface of said flange of said insert and said snap ring effective to urge said conical surface of said insert into a predetermined frictional engagement with said clutch member portion.

2. A preassembled subassembly for a limited slip differential mechanism comprising: a shaft engaging member including, a side gear portion, a conical clutch member portion having a longitudinally directed cylindrical pilot surface having an end connected to said clutch member portion and a removable snap ring connected to said cylindrical pilot surface in spaced relation to said clutch member portion; a removable insert, said insert including a conical wall defining a conical seat surface to frictionally engage said clutch member portion of said shaft engaging member, and including a flange adjacent the convergent end of said conical seat surface extending generally radially inwardly and terminating in a generally cylindrical pilot surface disposed in surrounding relation to said cylindrical pilot surface of said shaft engaging member to radially position said insert with respect thereto, said flange including a radially directed surface; and a generally annular spring-type washer compressed between said radially directed surface of said flange of said insert and said snap ring effective to urge said conical surface of said insert into a predetermined frictional engagement with said clutch member portion.

References Cited
UNITED STATES PATENTS

| | | | |
|---|---|---|---|
| 1,141,648 | 6/1915 | Mitchella | 192—107 X |
| 2,395,189 | 2/1946 | Lapsley et al. | 192—107 |
| 2,965,205 | 12/1960 | Winchell | 192—68 |
| 3,330,169 | 7/1967 | Carrico et al. | 74—711 |
| 3,331,262 | 7/1967 | Mazziotti | 74—711 |

FRED C. MATTERN, Jr., *Primary Examiner.*

ARTHUR T. McKEON, *Assistant Examiner.*